Feb. 7, 1933.    J. SOHN    1,896,428
CAMERA FINDER
Filed May 6, 1930
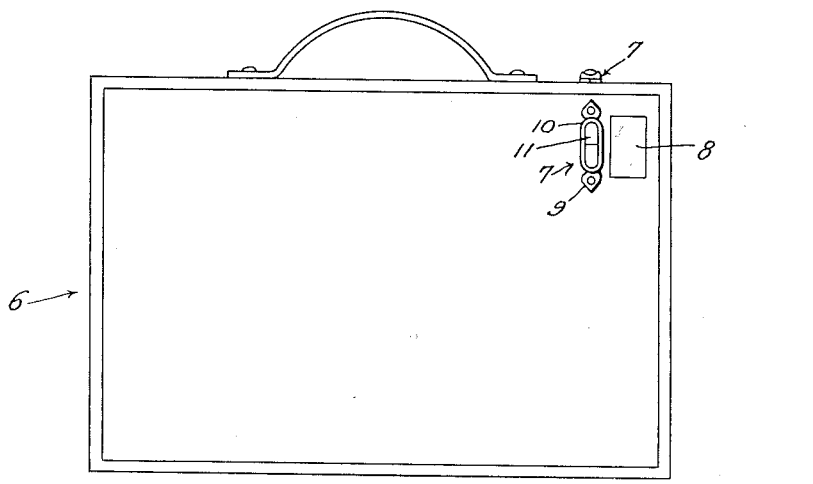
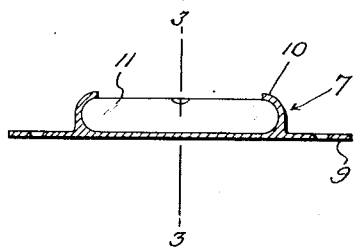
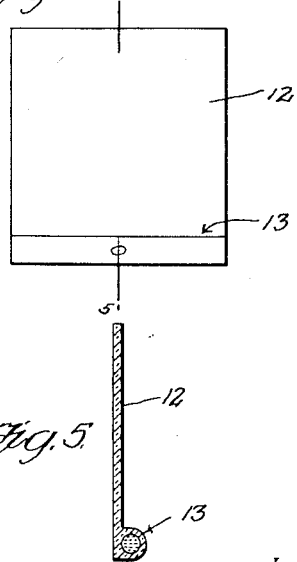
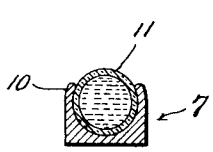
Inventor
John Sohn,
By *Clarence A. O'Brien*
Attorney Patented Feb. 7, 1933

1,896,428

UNITED STATES PATENT OFFICE

JOHN SOHN, OF DEADWOOD, SOUTH DAKOTA

CAMERA FINDER

Application filed May 6, 1930. Serial No. 450,189.

This invention relates to certain improvements and refinements embodied in the construction of a photographic camera, such as is used in conjunction with roll films designed primarily for taking photographs of a domestic variety.

More specifically stated, the novelty is predicated upon the provision in the camera of a spirit level associated with the vision glass panels or finders, the purpose of the invention being to associate a spirit level with the finder glass in such relationship and position as to enable the user of the camera to hold it substantially level while taking the picture.

The invention is carried into effect in two different embodiments. The first embodiment contemplates the provision of a level in the form of an attachment. The second embodiment contemplates the construction of a combined finder glass and level such as may be installed in the camera at the time of original construction.

In the drawing:

Figure 1 is an elevational view of a camera showing the attachment type of level.

Figure 2 is a detail view of one of the levels attached.

Figure 3 is a cross section on the line 3—3 of Figure 2.

Figure 4 is a plan view of a modified form of the invention showing the combined glass panel and level in one piece.

Figure 5 is a sectional view on the line 5—5 of Figure 4.

In the drawing, in Figure 1, the reference character 6 designates a conventional photographic camera of the individual ownership type. In this figure I show two level attachments, generally designated by the reference character 7. Each attachment is the same in construction, and a description of one will suffice for both. As seen in Figure 1 on the side, the attachment is located in the vicinity of the conventional stock finder glass panel 8. Thus there is a level on top and a level on the side to permit the customary usage in taking vertical and horizontal pictures, and to enable levelling of the camera in either instance.

As seen in Figure 2, the attachment comprises a base plate 9 apertured and ornamented to permit it to be conveniently attached to the camera in the place shown. This plate is provided with a suitably shaped receptacle 10 to accommodate the elongated bulbous shaped glass container 11 which is provided with the usual spirit level bubble medium.

The same idea is embodied in the second form of the invention, except that this is of the built-in type. Here, the finder glass is generally represented by the numeral 12 and this is formed at one end with an integral spirit level 13.

It is obvious therefore that the principle is the same in that it embodies the combination of a spirit level with the finder glass to enable the camera to be held in the proper plane for taking pictures. The invention makes it possible to hold the camera in a level position so that the snapshots will not be distorted by the position of the camera.

In the built-in type, the level is so arranged with respect to the marginal portion of the glass panel as to not obstruct the vision and to make it possible to level the camera and to observe the picture to be taken simultaneously.

It is thought that persons skilled in the art to which the invention relates will be able to obtain a clear understanding of the invention after considering the description in connection with the drawing. Therefore, a more lengthy description is regarded unnecessary.

Minor changes in shape, size, and rearrangement of details coming within the field of invention claimed may be resorted to in actual practice if desired.

I claim:

A new product of manufacture, a finder glass for a camera having formed integral therewith a closed container on one marginal side, the container being provided with a spirit level medium.

In testimony whereof I affix my signature.

JOHN SOHN.